Patented Sept. 6, 1938

2,128,984

UNITED STATES PATENT OFFICE 2,128,984

TREATMENT OF STILL RESIDUE

William H. Carmody, Dayton, Ohio, assignor to The Neville Company, Pittsburgh, Pa., a corporation of Pennsylvania No Drawing. Application January 24, 1935, Serial No. 3,291

5 Claims. (Cl. 260—7)

This invention relates to a decolorizing treatment for still residues resulting from the distillation of coal derivative liquids.

The manufacture of coumarone-indene resins by polymerization of crude solvent naphtha, involves the use of what is known as No. 2 crude solvent naphtha, having a boiling range of approximately 160° C. to 190° C. In fractionation of this material in preparation of a liquid for polymerization, and/or in the production of refined solvent naphtha, still residues are obtained. These still residues are resinous in nature, and may properly be termed resins. The color of the residues is, however, black, due both to the presence of fulvenes in the resin, and to the presence of free carbon in the residue. It has been recognized as possible to remove free carbon from still residue by a process of solution and filtration, or the like, followed by distillation for the recovery of resin. Such treatment, however, does not give resins usable for most purposes, since the recovered resin is still extremely dark in color, being of what is known in the art as a No. 9, or No. 10, color.

It may be considered that still residue, from the distillation of No. 2 crude solvent naphtha, consists chiefly of coumarone and indene polymers in various stages of polymerization, as a result of a heat polymerization occurring during distillation of the crude naphtha. There are also present in the still residue, traces of indene homologues, such as methyl-indene, ethyl-indene, dimethyl-indene, etc. These indene homologues are present to a greatly increased extent in those cuts of crude solvent naphtha having a boiling range higher than that of No. 2 crude solvent naphtha. While uses for such indene homologues have not commercially been developed, it may be taken as a fact that a prerequisite for the commercial development of such material is a reasonable reduction in their extreme coloration.

The object of my invention is to so treat crude still residues as to decolorize them to an extent rendering feasible their commercial use.

In my co-pending application Serial No. 1,897, filed January 15, 1935, I have explained my discovery that coloration in coumarone-indene resins consists of fulvenes, and that fulvenes may be destroyed as color bodies, and their formation prevented, in the resin, by a moderate hydrogenation of the resin. I have found the same principle applicable to the decolorizing treatment of still residues of the nature above defined.

In accord with my above discovery as to fulvene formation, it appears that the indene polymer possesses a cyclopentadiene derivative structure, and that the indene polymer is of chain formation, leaving a point of unsaturation in reactive position. That is, as the indene polymer is formed, there is a double bond in that portion of a cyclopentadiene structure in the terminal indene unit, which double bond is in that portion of the cyclopentadiene ring which is not included in the aromatic nucleus of the indene unit. Thus, the coloration of resins containing indene polymers becomes explainable in accordance with the following formula:

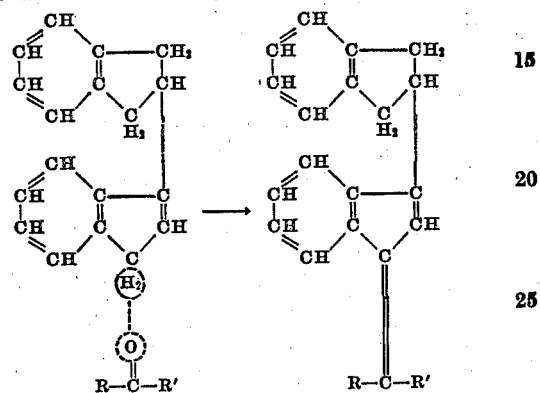

Usually in the reaction, graphically represented above, R and R' represent hydrogen, or "alkyl", or "aryl", radical, depending upon the particular aldehyde or ketone entering into the reaction. R or R' might, however, represent an oxidized indene or coumarone molecule, having aldehyde or ketone properties, but which is perhaps not properly defined by the term "aryl" or "alkyl."

It will be noted from the above formula, that the presence of fulvene results from a reaction in which oxygen is introduced into the structure, the introduced oxygen causing the formation and elimination of water. The ultimate cause of the resin coloration is not, therefore, oxidation directly, but is the reaction caused by the introduction of oxygen.

While what is known as the "after-yellowing" in coumarone-indene resin is undoubtedly due to a phenomenon in which surface contact of the resin with oxygen causes the indene, and possibly the coumarone, polymers to assume the properties of an aldehyde or ketone, the intense coloration of still residue appears chiefly due to action in the crude naphtha prior to and during distillation. Thus, even a moderate aging of crude solvent naphtha permits it to take up oxygen adequate for a substantial formation of aldehydes or ketones. Upon distillation, the catalytic effect of the heating to which the liquid is subjected produces an intense color reaction in the heat polymers remaining as still residue of the distillation.

I have succeeded in so reducing the coloration of a residue resulting from the distillation of crude solvent naphtha as to render the still residue suitable for general resin purposes. This I have done by a method comprising as a step a moderate hydrogenation of the resin, the mechanism of which hydrogenation will be hereinafter explained. Procedurally, my method for decolorizing still residue is as follows:

The first step in my method of decolorizing still residue consists in treating the nickel aluminum alloy to prepare what is known in the art as the "Raney" catalyst. In so doing, nickel aluminum alloy, comprising nickel and aluminum in substantially equal proportions, is introduced into a water solution of sodium hydroxide. The solution containing the alloy is boiled to complete the reaction, and is washed several times to obtain pure nickel sponge remaining from solution of the aluminum content of the alloy. The water may then be eliminated from the catalyst by boiling in the presence of refined inert naphtha.

A solution of the still residue in a suitable solvent is made. A suitable coal derivative solvent such as refined high-flash naphtha may be used. With the aromatic solvent some petroleum distillate might be included. To the solution of still residue I add the sponge nickel catalyst. I have found equal quantities by weight of the sponge nickel and of solid still residue to be satisfactory. I then introduce hydrogen into the container having therein the still residue solution and the catalyst, flushing out all air, and establishing a completely hydrogen atmosphere within the container. The solution is subjected to agitation in the presence of hydrogen.

I have found that the hydrogenation which I desire to effect may be conducted at room temperature, and at normal atmospheric pressure. Hydrogen is desirably introduced continuously to replace that taken up by the material under treatment, if it is desired that hydrogenation be carried to a point at which the greater proportion of the molecules of still residue are affected. A continual supply of hydrogen, in addition to rendering it quantitatively available, also prevents the pressure within the container falling below normal atmospheric pressure.

I have found relatively few hours of treatment adequate to effect my desired hydrogenation under normal atmospheric pressure. If it be desired to expedite the reaction, moderate superatmospheric pressure may be employed, and moderate elevation of temperature may also be employed. I prefer to utilize moderate pressure such as a pressure not greatly exceeding from 5 to 6 atmospheres, and moderate temperature such as a temperature not greatly exceeding 150° C. It should be understood that elevated temperature and elevated pressure are not essential to the hydrogenation as desired and performed by me. In fact I have gone so far in this direction as to effect a definite and useful hydrogenation of still residue at normal room temperature, and under the subatmospheric pressure caused by the entry of hydrogen into the molecules of still residue with a fixed volume of hydrogen included with a solution of still residue in a closed vessel.

The reason for the facility with which still residue may be hydrogenated adequately for my purpose, will be hereinafter explained with relation to the reaction of fulvene development, and the structure of the indene molecule as hereinbefore set forth. It will suffice for the present to note that pressure and heating are not essential to the hydrogenation of the material acted upon, and that a notably small quantity of hydrogen is sufficient to effect the hydrogenation specifically desired.

It should be explained that pressure and catalyst efficiency are reciprocal, and that when I state in the specification that I avoid high pressure, it is to be understood that low pressure, is coupled with an efficient catalyst, such as the "Raney" catalyst, above described.

After hydrogenating treatment for an adequate period of time, the solution of still residue is, by filtration or in other suitable manner, cleared of free carbon and other mechanically removable impurities. In so doing a small amount of any one of the well-known filter-aids, such as an infusorial earth or a silica-gel, is agitated into the solution, before filtration or centrifugation, in order to coagulate free carbon and other physically present impurities.

The solution is then distilled for the recovery of hard resin.

The hard resin recovered as a decolorized still residue may be of any depth of color from a substantially colorless resin, falling under the trade color designation of No. 1 color, or less, to a definitely tinted resin. In terms of the art relating to color numbers, it should be emphasized that the initial still residue, as clarified by the removal of carbon, is of the very dark reddish-brown coloration designated in the art as a No. 9, or No. 10, color.

It has been noted that the quantity of hydrogen used in effecting the desired hydrogenation completely or approximately, is notably small. This is explained by the fact that I need not effect a hydrogenation of the resin polymers throughout the structure, but theoretically need hydrogenate merely to the extent that the fulvene structure developed in each polymer is destroyed by hydrogenation at points involving the entry of very few hydrogen atoms into the molecule.

Taking the illustrative formula given above, the desired hydrogenation occurs only at the last indene unit of the individual polymers, regardless of the stage of polymerization they represent. This is because I seek to effect hydrogenation only in the fulvene structure developed from the last indene unit of the polymers. That is, referring to the terminal indene unit of the indene polymer, as it has been developed into a fulvene structure, and representing this fulvenated unit alone, as follows,

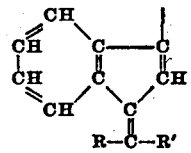

I effect hydrogenation merely at one or both of the double bonds existing outside the aromatic nucleus of this terminal fulvenated unit. Thus, hydrogenation is effected at either the double bond existing in the cyclopentadiene structure lying outside the aromatic nucleus, or is effected at the double bond formed by elimination of water in producing the typical fulvene structure, or at both of these points.

Hydrogenation at either of the above-noted points in the fulvenated molecule serves to destroy the fulvene structure, and thereby to destroy the effect of the color body produced by fulvenation of the molecule. It should be understood that once this fulvene structure has been destroyed, it cannot be regenerated. As we may consider still residue as having initially a substantially maximum fulvene development therein, the coloration of the resin may be reduced to any desired degree without possibility of a later increase in depth of color through the phenomenon of after-yellowing.

The extent to which the color depth is decreased in the still residue, depends, as noted above, upon the completion of hydrogenation throughout the molecules of still residue numerically considered. That is, a destruction of the fulvene structure in 50% of the polymers will leave in the still residue a deeper coloration than if 90% or more of the polymers be defulvenated.

It should be borne in mind that it is necessary to effect hydrogenation at one point only of a polymer, namely in the terminal unit of the polymer, in order to destroy the fulvene structure thereof. In this connection, I may explain that what might be termed a forced hydrogenation of the polymers is not only uneconomical, both in the requisite conditions established and in the quantitative amount of hydrogen utilized, but is also positively detrimental in the production of a resin to be put to various uses.

It is possible by my treatment to obtain clear, tinted, resins by so regulating the supply of hydrogen during treatment that only a desired proportion of the polymers are affected. This gives substantially the same result as that obtainable by an intentional treatment of coumarone-indene resin with an aldehyde or ketone, as disclosed in my co-pending application Serial No. 2,587, filed January 19, 1935. Because of the specific coloration of still residue, the resin obtained by this partial defulvenation of a body of still residue is closely similar to that obtained by a tinting treatment of coumarone-indene resin with acetaldehyde.

Still residue, as decolorized by my process, is suitable for use as a tile resin, and is generally useful in coating compositions in which a resin having the relatively low melting point of still residue resulting from the distillation of crude solvent naphtha, may advantageously be used. It may be stated that the reduction in depth of color of the still residue, effected by my treatment, renders it generally useful as a resin.

Throughout the specification and claims the molecules acted upon by hydrogenation, have been termed "indene polymers." By this term it is my intention to include the polymers of indene derivatives, such as methyl-indene and ethyl-indene, which have been mentioned above.

Whereas crude solvent naphtha has been noted as the source of the indene polymers and indene derivative polymers termed generally "indene polymers", it is to be understood that equivalent still residue is obtainable from materials not properly designated crude solvent naphtha, but which contain in part the same polymerizable bodies. As an example of such equivalent sources of the still residue, I may give the material known as "drip-oil", which is used as a source of coumarone-indene resin.

In describing step by step the process by which I obtain colorless still residue, or still residue in which the coloration has been decidedly modified, I have stated that the solution of hydrogenated still residue is treated for removal of physical impurities in some suitable manner, as by filtration and centrifugation, after the hydrogenating treatment. This is a desirable stage in the complete process at which to remove free carbon, and other physical impurities, for the reason that the same step which removes these impurities also removes the catalyst from the still residue solution. It is, of course, possible first to remove such physical impurities from a solution of still residue, and thereafter to hydrogenate the still residue in solution. Such procedure, however, involves an additional step in that physical impurities and the catalyst are separately removed.

It may be, that in certain instances still residue may be obtained which has associated with it such small quantity of physical impurities, such as free carbon, that the removal of physical impurities is not necessary in order to obtain light coloration. It may also be that the user of my decolorizing method has available for hydrogenation still residue which has, by a previous treatment, been deprived of free carbon, and other physical impurities. In either such instance, the process will be complete without the step of removing physical impurities, such as the free carbon usually associated with still residue.

I claim as my invention:

1. The herein described method of treating still residues resulting from the distillation of crude solvent naphtha and containing indene polymers the terminal units of which contain a cyclopentadiene ring, which comprises subjecting a solution of said residues to gaseous hydrogen in the presence of an active nickel hydrogenation catalyst for hydrocarbons under such conditions of temperature and pressure as to saturate a double bond of said terminal unit cyclopentadiene rings of indene polymers present in said residue but with minimized and non-commensurate introduction of hydrogen into the aromatic ring structure of said terminal units of the resin polymers and thereby stabilizing said units against reactions resulting in color formation in the resin.

2. The herein described method of treating still residues resulting from the distillation of crude solvent naphtha and containing indene polymers whose terminal units contain a cyclopentadiene ring, which comprises subjecting a solution of said residues, as the sole material susceptible of hydrogenation, to gaseous hydrogen in the presence of an active nickel hydrogenation catalyst for hydrocarbons under such conditions of moderately elevated temperature and pressure so related as to saturate a double bond of said terminal unit cyclopentadiene rings of indene polymers present in said residue but with minimized and non-commensurate introduction of hydrogen into the aromatic ring structure of said terminal units of the resin polymers and thereby stabilizing said units against reactions resulting in color formation in the resin.

3. The herein described method of treating still residues resulting from the distillation of crude solvent naphtha and containing indene polymers whose terminal units contain a cyclopentadiene ring, which comprises subjecting a solution of said residues, as the sole material susceptible of hydrogenation, to gaseous hydrogen in the presence of an active nickel hydrogenation catalyst for hydrocarbons at a temperature not substantially over about 150° C. and at a pressure not substantially over 5 to 6 atmospheres and thereby saturating a double bond of said terminal unit cyclopentadiene rings with minimized and non-commensurate introduction of hydrogen into the aromatic ring structure of said terminal units of the resin polymers whereby to stabilize said units against reactions resulting in color formation in the resin.

4. The herein described method of treating still residues resulting from the distillation of crude solvent naphtha and containing colored indene polymers whose terminal units contain a cyclopentadiene ring, which comprises subjecting a solution of said residues, as the sole material susceptible of hydrogenation, to gaseous hydrogen in the presence of an active nickel hydrogenation catalyst for hydrocarbons at a temperature not substantially over about 150° C. and at a pressure of not substantially over about 5 to 6 atmospheres, thereby saturating a double bond of said terminal unit cyclopentadiene rings with minimized and non-commensurate introduction of hydrogen into the aromatic ring structure of said terminal units of the resin polymers, then separating mechanically removable impurities from the solution, and distilling solvent from the treated residue and thereby recovering resin stabilized against color formation reactions in said units.

5. A hydrogenated polymerized coumarone indene resin resultant from still residue remaining after the distillation of crude solvent naphtha, the resin being characterized by having the cyclopentadiene structure of terminal indene units of the polymers saturated with hydrogen, by incomplete saturation of the aromatic rings of the indene units, and by being of light color and by substantial permanence against fulvene formation.

WILLIAM H. CARMODY.